United States Patent [19]

Shatila

[11] Patent Number: 4,889,734
[45] Date of Patent: Dec. 26, 1989

[54] METHOD FOR PREPARING QUICK-RECONSTITUTING FOODSTUFFS

[75] Inventor: Mounir A. Shatila, Blackfoot, Id.

[73] Assignee: Basic American Foods, San Francisco, Calif.

[21] Appl. No.: 862,208

[22] Filed: May 13, 1986

Related U.S. Application Data

[63] Continuation of Ser. No. 555,009, Nov. 25, 1983, abandoned.

[51] Int. Cl.$^4$ ................................................. A23B 7/02
[52] U.S. Cl. ...................................... 426/444; 426/456; 426/459; 426/462; 426/463; 426/464
[58] Field of Search ............... 426/615, 618, 637, 640, 426/384, 385, 444, 456, 459, 462, 463, 464

[56] References Cited

U.S. PATENT DOCUMENTS

| | | | |
|---|---|---|---|
| 2,707,684 | 4/1955 | McCready et al. | 426/385 |
| 2,713,003 | 7/1955 | Rivoche | 426/444 X |
| 2,729,566 | 1/1956 | Harrington et al. | 426/444 |
| 3,188,750 | 6/1965 | Davis et al. | 426/385 X |
| 3,359,123 | 12/1967 | Katucki et al. | 426/444 X |
| 3,438,792 | 4/1969 | Kruger | 426/385 X |
| 3,573,070 | 3/1971 | Smith et al. | 426/385 |
| 3,644,129 | 2/1972 | Sloan | 426/385 |
| 3,973,047 | 8/1976 | Linaberry et al. | 426/456 X |

*Primary Examiner*—Arthur L. Corbin
*Attorney, Agent, or Firm*—Sandler & Greenblum

[57] ABSTRACT

Foodstuffs which have been frozen are partially dehydrated in a gaseous medium having a dry bulb temperature higher than about 200° F. and a wet bulb temperature higher than about 120° F. prior to finish drying at a dry bulb temperature of less than about 180° F. to a storage stable moisture content of less than 12% by total weight. Dehydrated products ranging in size from 1/16" thick slices to ¾" dice produced by this dehydration process reconstitute in less than about 15 minutes with an amount of water equivalent to at least 85% of the previously removed moisture.

30 Claims, No Drawings

METHOD FOR PREPARING QUICK-RECONSTITUTING FOODSTUFFS

This application is a continuation of application Ser. No. 555,009, filed 11/25/83, now abandoned.

BACKGROUND OF THE INVENTION

1. Field of Invention

The invention relates to a method for producing dehydrated vegetables capable of rapid reconstitution. More particularly, the invention is directed to a sequence of cooking, freezing and dehydration steps carried out under controlled conditions so as to produce a product having a porous interior and exterior surface.

2. Description of the Prior Art

Dehydration is one of the oldest methods for preserving food. Commercial production of dehydrated foods, however, is a development of the twentieth century. During the last forty years many procedures have been developed in an attempt to produce dehydrated products which upon reconstitution resemble fresh food in taste, texture, and appearance. More recently there has been a general concern for quick rehydrating products. Most of these efforts have resulted in unsatisfactory processes and products. A problem common to prior dehydration methods is a phenomenon referred to as case-hardening or the formation of a horny, vitreous material primarily on the surface of the food. It has been postulated that this may result from the collapse of the cellular structure of the vegetable which dehydrates into a dense mass of material of low rehydration characteristics.

Prior art methods for producing quick rehydrating products include soaking the material in solutions of salt or leavening agents prior to dehydration, subjecting food material to dehydration techniques which effect an expansion or puffing of the product and freeze-drying. U.S. Pat. No. 2,705,679, dehydrates potato dice using a fluidized bed dryer to form tan-colored pieces hollow in the center with the sides puffed out much as are the sides of a pillow. U.S. Pat. No. 3,338,724 discloses the importance of soaking potato pieces in a salt solution prior to such dehydration to produce puffed potato products having a density of 0.15 to 0.20 gm/cc. U.S. Pat. No. 3,438,792 freeze dries potatoes prior to finish drying in hot air to avoid case-hardening. U.S. Pat. No. 3,644,129 is based on the discovery that minimizing the to such combined freeze drying-hot air drying is effective in improving the rehydration characteristics of the dehydrated product. U.S. Pat. No. 3,573,070 discloses a process comprising freezing prior to combined freeze drying-hot air drying in an attempt to produce improved dehydrated products. U.S. Pat. No. 3,188,750 attempts to produce a dehydrated product possessing a high degree of biological integrity by first hot air drying raw material prior to freeze drying which is preferably followed by another hot air drying. U.S. Pat. No. 2,729,566 teaches that rapid freezing followed by a slow thawing at a temperature within the range of 28° F. to 32° F. for at least 15 minutes prior to hot air dehydration is critical and that potato pieces being processed should not reach a temperature higher than about 130° F. during dehydration. U.S. Pat. No. 2,707,684, however, discloses that if potato pieces are rapidly frozen prior to dehydration, the final products will have a slow rehydration rate. U.S. Pat. No. 2,713,003 preconditions food products by freezing, throughout or superficially, prior to dehydrating. U.S. Pat. No. 2,278,472 also freezes food prior to dehydration. U.S. Pat. No. 3,359,123 is directed to rendering potatoes more amenable to freeze-thaw procedures by a controlled cooking procedure which avoids moisture pickup by the potato followed by dehydrating the product under such conditions so as to avoid any further gelatinization of the potato pieces, for example, by drying in air having a 20 to 40% relative humidity. G.B. Patent No. 1,084,714 dehydrates vegetables in a gas containing from about 5% to about 50% by weight of water vapor at a temperature from 194° F. to 428° F. U.S. Pat. No. 3,973,047 is directed to reducing the level of microorganisms in dehydrated vegetables by subjecting vegetables, partially dried to between 8 and 50% moisture, to air having dry bulb/wet bulb temperatures, ranging from 200° F. dry bulb/180° F. wet bulb to about 140° F. dry bulb/120° F. wet bulb, which are sufficiently high to kill bacteria without causing significant dehydration, prior to finish drying to a final moisture content of less than about 8%.

The foregoing disclosures are representative of the attempts made to overcome the shortcomings of dehydrated food products as compared to freshly prepared foodstuff. The food industry has had to rely on similar procedures to prepare dehydrated vegetables over the years. Recently, cooking and eating habits have been influenced by a number of factors which reduce the time allocated for food preparation in households as well as in eating establishments. This has caused a need for good nutritious foods which can be prepared quickly and easily. A number of frozen entree, side dish, and complete dinners, in addition to canned products, have been available in the marketplace which attempt to satisfy the consumer's need for convenient foods. Notwithstanding numerous efforts to develop industrially produced and commercially acceptable dehydrated food products, there is a limited number of dehydrated vegetable products on the market. Such vegetables are primarily used as flavoring in soups, stocks, casseroles, and the like. Moreover, dehydrated vegetables used in instant soups, i.e., having a reconstitution time of less than about 5–20 minutes, have been small in size in order to permit preparation within the prescribed time period. Normally the vegetable piece size is no larger than about ⅛ inch in cross-section. Typically, the dehydrated products have been reduced to a powder. Complaints about such products include that the dehydrated pieces reconstitute incompletely and are tough and chewy despite their small size. Larger vegetable pieces have only recently been used as ingredients in commercial mixes containing dehydrated vegetables, stock seasoning, and noodles. These mixes are used as starting materials for preparation of soup to which only water and meat need be added in the kitchen. Their recipe normally requires as long as 1½ hours in preparation for consumption.

SUMMARY OF THE INVENTION

The present invention relates generally to the production of dehydrated food materials and preferably vegetables. More particularly the invention is directed to a process for dehydrating vegetable materials which are capable of quick rehydration in water to more closely resemble the taste, texture, and appearance of fresh vegetables than heretofore has been commercially achieved.

The product of the instant invention exhibits reconstitution properties and characteristics which are not exhibited by dehydrated vegetables currently available in the market. The dehydrated product of the present invention is porous throughout its interior as well as on its exterior surface. It exhibits neither a shrunken appearance typical of conventionally dried vegetables nor an expanded or puffed shape often associated with food materials which have been subjected to the specialized techniques of previous attempts to manufacture quick rehydrating food products. Moreover, the quick rehydrating vegetable products of the present invention can be produced in larger sizes than heretofore was thought possible for products for which there is a concern for rehydration time. Upon rehydration the product reconstitutes rapidly to a uniform degree. The resultant product does not exhibit objectionable firm, chewy, interiors and mushy exterior surfaces which tend to slough during reconstitution as is typically the case with conventionally dried products.

The products of the present invention have been found to be particularly useful as a mix for sauces, salads, stews and soups which, in contrast to commercially available products requiring upwards of 90 minutes to reconstitute, can be essentially completely rehydrated in preparation for consumption in less than about 10 to 15 minutes.

It is believed that the advantages of the present invention are achieved by subjecting frozen foodstuff, from which essentially no moisture has been artificially removed, to dehydration in a gaseous medium having a dry bulb temperature higher than about 200° F. and a wet bulb temperature higher than about 120° F., and dehydrating the foodstuff to a storage stable moisture content of less than about 12% by total weight.

It has been found to be preferable to at least partially dehydrate foodstuff by subjecting the same to a dry bulb temperature in the range of about 225° to 400° F. and a wet bulb temperature in the range of about 120° to 170° F., for a time sufficient to effect the removal of between about 10 to 99% by weight moisture from the foodstuff. Forced air streams having a velocity higher than about 300 F.P.M. and preferably between about 350 to 2000 F.P.M. to effect a fluidization of the product during dehydration is a particularly suitable drying expedient for purposes of the present invention.

Finish drying partially dehydrated foodstuff to a storage stable moisture content of less than about 12% by total weight is accomplished in an atmosphere having a dry bulb temperature preferably of less than about 220° F., and more preferably between 120°–185° F. Particularly good results are achieved when temperatures between about 130° to 160° F. dry bulb are used. Dehydrating foodstuff in accordance with the present invention to a storage stable moisture content less than about 12% by total weight is typically effected in less than about 6 hours total drying time, and preferably between about 3 to 5½ hours.

Preliminary to partial dehydration the foodstuff is subjected to treatments with aqueous media at temperatures above about 120° F. to preferably as high as about 212° F. for up to 75 minutes to precook, and for between 3 to 75 minutes to cook, the foodstuff. When pressurized stem is used, the product is subjected to temperature higher than 212° F. It is preferred to cool the foodstuff in water intermediate these steps.

Freezing the food material prior to partial dehydration contributes significantly to producing dehydrated products with the desired characteristics and can be accomplished preferably by exposing foodstuff to an atmosphere having a temperature between about −20° to +20° F. for up to about 60 minutes or until the product is frozen throughout.

Foodstuff which is particularly suitable for purposes of the present invention include vegetable and fruit materials such as potatoes, sweet potatoes, carrots, parsnips, beets, beans, peas, peppers, onion, corn, barley, rice, wheat, apples and bananas.

Particularly good results are achieved when potatoes, processed in accordance with the present invention, are partially dried in the gaseous medium having a dry bulb temperature in the range of about 250° to 350° F. and preferably 300° F., and a wet bulb temperature in the range of 120° to 160° F. and preferably 140° F.

Among the many advantages realized by the practice of the present invention include the production of foodstuff, such as dehydrated vegetables, which rapidly rehydrate to replace at least 85% and preferably 90–95% of the previously removed moisture in less than about 15 minutes.

Another advantage of the present invention is that a process for dehydrating foodstuff is provided wherein the time required to reduce the moisture content of the foodstuff to a storage stable extent of less than about 12% by total weight is substantially reduced relative to the time required if conventional dehydration procedures were used.

A further advantage is that dehydrated vegetables having a minimum dimension as large as about ¾ inch can be produced which are capable of such rapid rehydration.

It is, thus, an object of the present invention to produce a dehydrated food product which, when reconstituted, closely resembles the taste, texture and appearance of its fresh food counterpart.

Another object of the present invention is to produce dehydrated food products essentially devoid of a casehardened interior.

And yet another object of the invention is to produce quick rehydrating vegetables having shapes and sizes varying from 1/16" slices to ¾" dice, including ½" slices, ½" dice, ½"×½"×¾" strips and ½"×¾"×¾" strips.

A further object of the present invention is to provide a method for dehydrating foodstuff to a storage stable moisture content of less than about 12% by total weight in less than about 6 hours total drying time.

Still another object of the present invention is to provide a dehydrated food product which is substantially completely reconstituted by a process comprising rehydrating the dehydrated foodstuff in an aqueous medium to replace at least about 85% and preferably at least 90–95% of the moisture previously removed by the dehydration process.

An yet another object of the present invention is to produce dehydrated foodstuff having a storage stable moisture content of less than about 12% by total weight, a Bulk Index within the range of about 260–700 in addition to a Rehydration Ratio within the range of about 2.9–10.5.

DESCRIPTION OF THE PREFERRED EMBODIMENT

Preliminary to carrying out the process of the present invention the foodstuff, which is preferably vegetable material, is normally cleaned of dirt and debris, peeled, and trimmed if necessary, prior to dividing into pieces if so desired.

While selected vegetable material such as grains and legumes can be processed whole, it is preferable to divide large vegetables such as potatoes and carrots into pieces such as slices, dices, or strips. Although the invention is applicable to a variety of foodstuff and vegetables in particular, the best mode presently contemplated for carrying out the process shall be described herein in full, clear, concise, and exact terms in connection with Russet Burbank potatoes. It should be recognized, however, that certain treatment parameters may vary depending on the size and the particular material being processed.

Potatoes were cut into large pieces having a size of about ½"×¾"×¾". The potatoes may also be cut into pieces having other shapes and sizes such as ¾" dice, in addition to slices and strips. The potato pieces are then subjected to treatments comprising heating with steam or water having a temperature within the range of about 120° F. to 212° F. and preferably between about 165° F. to 200° F. for between 3 to 75 minutes, cooling in tap water to a temperature below about 80° F., and cooking in steam or water having a temperature within the range of about 120° F. to 212° F. and preferably between 165° F. to 200° for between 3 to 75 minutes. Particularly good results were achieved when ½"×¾"×¾" potato pieces were heated for 30 minutes in water having a temperature of about 170° F., cooled in water having a temperature of about 60° F. for 10 minutes, and heated in water having a temperature of 180° F. for 30 minutes. Generally the nature of the raw material being processed will determine which of these treatments alone or in combination will be used. For potatoes, superior results are achieved with this sequence of steps. For selected frozen vegetables, however, such as green beans and corn, a blanch in water having a temperature in the range of about 140° F. to 200° F. or in atmospheric steam for less than about 3 to 15 minutes prior to partial drying produces good results. Among the advantages resulting from such procedures are the inactivation of enzymes, gelatinization of starch and strengthening of the cellular tissue to withstand subsequent processing.

Potatoes and other vegetable material may also be treated with solutions containing agents to reduce discoloration and minimize stickiness of the product prior to the partial dehydration step without adversely affecting the quality of the finished product. Although minimizing stickiness may be accomplished by surface drying the foodstuff, care must be taken to avoid removing significant amounts of natural moisture from the product prior to partial drying in accordance with the present invention. Otherwise case-hardening is likely to occur and the quality of the product reconstituted from the finished dried state is adversely affected.

The moisture content of potato pieces are typically within the range of about 73 to 87% by total weight prior to the removal of any moisture therefrom. For example, the ½"×¾"×¾" Russet Burbank dice had a moisture content of about 81% by total weight prior to dehydration in accordance with the present invention. Typical moisture contents based on total weight of other vegetables before any dehydration occurs includes: carrots, about 90%; sweet potatoes, about 83%; bell peppers, about 81%; Red Pontiac potatoes, about 85%; White Rose potatoes, about 85%. As is generally known, however, the natural moisture contents of all vegetables vary within ranges. The *Composition of Foods; Raw, Processed and Prepared*, Agricultural Handbook No. 8, Agricultural Research Service, U.S.D.A., U.S. Government Printing Office, Washington, D.C. 20402 sets forth the moisture content ranges for a variety of food materials including those which can be processed in accordance with the present invention.

It has further been discovered that particularly good results were achieved when potato pieces as well as other vegetables are subjected to a freezing operation prior to any significant dehydration taking place. The potato pieces at essentially their natural moisture levels, except for moisture lost during storage and handling, were frozen. Although freezing may be carried out in a number of ways, immersion freezing in a refrigerated liquid or brine is least preferred. While tunnel or blast freezing at temperatures between about −20° F. to +20° F. may be used, it is preferred to subject potatoes to cold air having a temperature of −20° F. to 0° F. in a freezing chamber such as a spiral freezer, for at least about 45, and preferably 60 to 120 minutes. Although freezing preliminary to partial drying is important to the process of the present invention, the particular manner by which the foodstuff is frozen is not critical. It has been found that any expedient for freezing can be used with minimal affect on the characteristics of the final product if the frozen foodstuff is subsequently subjected to dehydration in an atmosphere having dry bulb-wet bulb temperatures as herein described.

The frozen foodstuff at essentially its natural moisture content is then subjected to a critical sequence of dehydration procedures directly from the frozen state. The foodstuff is first partially dried by exposure to hot air having a dry bulb temperature (°F. dry bulb) in excess of about 220° F. dry bulb, and a wet bulb temperature (°F. wet bulb) of at least 120° F. wet bulb for a time period between about 3 to 20 minutes. Forced air streams having a velocity as high as about 2000 F.P.M. are used during partial dehydration with particularly good results. The fluidization effected by the forced air stream is beneficial in reducing the incidence of products sticking together as well as in promoting uniform exposure of product to the dehydrating medium. In general, this can be effected using air velocities of between about 350 to 2000 F.P.M. depending on the size and weight of the food material being treated. The extent to which the moisture content of the product is reduced by partial drying under such conditions depends on the natural moisture content of the foodstuff being processed. It has been found that at least about 10% by weight moisture, i.e., based essentially on the natural moisture content of the foodstuff, should be removed at this stage, although moisture removal to a greater extent can also be affected. Depending on the foodstuff being processed, for example barley, as much as about 99% by weight moisture can be removed by dehydrating under such conditions. The following table lists vegetables processed in accordance with the present invention for purposes of Tables II and III along with a range for the percent by weight moisture removed during this stage of processing.

TABLE I

| Vegetable | By Weight Moisture Removed |
|---|---|
| Russet Burbank Potatoes | 42–77% |
| Red Pontiac Potatoes | 56–62% |
| White Rose Potatoes | 54–77% |
| Carrots | 51–93% |

TABLE I-continued

| Vegetable | By Weight Moisture Removed |
| --- | --- |
| Sweet Potatoes | 37-83% |
| Bell Peppers | 10-52% |
| Barley | 97-99% |

Potato pieces having moisture contents within the range of about 73-87% by total weight may be partially dried to a moisture content in the range of about 50-75% by total weight by removing about 42 to 77% by weight moisture.

Forced air at velocities of between 850 to 1400 F.P.M. having temperatures in the range of about 250° F. dry bulb/135° F. wet bulb to 350° F. dry bulb/150° F. wet bulb are particularly suitable for potatoes. A superior end product was produced when the potato pieces were subjected to a forced air stream at 1200 F.P.M. having a temperature of about 300° F. dry bulb/140° F. wet bulb for 8 minutes to remove about 52% by weight moisture thereby reducing the moisture content by total weight thereof to about 67%.

As used herein for purposes of the present invention the wet bulb and dry bulb temperatures are readings taken from thermometers at an elevation of about 4,500 feet above sea level. As one can appreciate, wet bulb temperatures are elevation-dependent and, therefore, may vary from the disclosed ranges relative to changes in elevation without falling outside the scope of the present invention. Standard psychrometric charts can be used to convert treatment parameters measured at an elevation of 4,500 feet above sea-level to those for other elevations at which the invention is practiced.

It has been found that dehydration under the foregoing conditions substantially eliminates case-hardening of the product which can result from conventional drying. Conventional hot-air drying progressively removes water first from the surface and, only when the exterior is substantially dry, from the interior of the potato. Case-hardening of the product is to be avoided because such condition reduces and ultimately substantially inhibits the migration of water from the interior to the exterior of the product. Thus, dehydration to a storage-stable moisture level is extremely slow and scorching is a concern. The case-hardened surface also adversely affects rehydration characteristics. Because the surface is not porous but rather exhibits an impervious skin, prolonged soaking is required in order for water to reconstitute the interior of the product. Often this condition prevents complete rehydration within the prescribed time. Incompletely rehydrated products exhibit firm, chewy centers, and surfaces which are prone to sloughing. All of such characteristics are to be avoided.

The dehydration procedure of the present invention prevents case-hardening by promoting uniform moisture removal from throughout the product. By uniformly dehydrating the foodstuff, the natural passages provided by the interstitial spaces between the cells and the porous condition of the product affected by freezing does not become shrunken or clogged at the surface. The moisture, therefore, can freely pass from the interior of the piece through the exterior surface to rapidly dehydrate the product. Moreover, it has been found that case-hardening appears to be a concern primarily in the initial stages of drying, i.e., during removal of the first 10 to 25% by weight moisture from the product. If case-hardening is avoided during the initial stage of the dehydration operation using the partial drying technique of the present invention, dehydration can be completed using a preferred expedient therefor, such as conventional hot air techniques as discussed below, without destroying the porous characteristics of the product provided by the treatments of the present invention. Although porosity is an essential characteristic in the resultant product, excessive puffing or expansion of the product during dehydration is to be avoided because attendant cell rupture releases soluble solids such as starches and sugars contained within the cell. Upon subsequent reconstitution these solids are readily solubilized into and are leached from the food material being rehydrated. The nutritional value of the product is thus substantially reduced. Such products also tend to be brittle and break or slough during reconstitution. It has been found that such objectionable features are avoided by subjecting foodstuff to the sequence of freezing followed by partial dehydration, in accordance with the present invention, which is believed to be responsible for the desired attributes of the products of the present invention.

The partially dehydrated potato pieces and other vegetables are finished dried. Due to the effects of prior treatments of partial drying at the aforementioned dry bulb-wet bulb temperatures and freezing, the potato pieces have been sufficiently conditioned so that the particular expedient used for dehydration to a storage-stable moisture content is not a major concern. It has been discovered that exposing the potatoes and other vegetables to a hot atmosphere until a storage-stable moisture content is achieved produces an end product with suitable characteristics. For example, hot air dehydration of the product in a stationary or fluidized bed, preferably at temperatures below about 180° F., to storage stable moisture contents of less than about 12% by total weight, result with particularly good products upon reconstitution. The potato pieces are finish dried to a moisture content of about 6 to 10% by total weight in air having a dry bulb temperature within the range of about 160° F. to 180° F. Finish drying using a stationary bed, continuous belt dryer is completed in less than about 6 hours and typically in about 3 to 5½ hours. The partially dried potato pieces having a moisture content of about 67% by total weight were finished dried to a moisture content based on total weight of about 7% by subjecting the pieces to air having a dry bulb temperature of about 160° F. for about 3½ hours. By the process of the present invention, dehydration time may be reduced compared to conventional procedures using similar belt-trough dryers. Moreover because of the porous nature of the partially dried product, moisture is more readily removed from the interior of the product. Thus, the depth to which the partially dried product can be loaded onto the drying belt of a conventional belt-trough dryer is greater than heretofore was practical. Hence for a given period of time, a substantially larger quantity of product may be dehydrated to a similar extent. In addition to the other technical achievements resulting from the practice of the present invention, therefore, there is an increase in production capacity with attendant economic advantages.

The dehydrated potato pieces having a storage stable moisture content were packaged in a conventional manner for handling and storage purposes. To prepare the dehydrated foodstuff of the invention for consumption, the product is merely placed in water and permitted to stand until essentially reconstituted and heated. Particularly good results are achieved when water having a temperature within the range of about 170° F. to 212° F. is added to the dehydrated foodstuff or the product is added to water which is brought to a boil and simmered for up to 10 to 15 minutes. The potatoes and other vegetables prepared in this manner are essentially completely reconstituted and have a taste, texture, appearance, and other organoleptic characteristics more closely resembling vegetables prepared directly from the fresh state than heretofore has been commercially available. The reconstituted vegetables make excellent soups, stews, sauces, casseroles and side dishes with potatoes also being particularly suitable for use in salad mixes.

In addition to the high quality of the food products made in accordance with the present invention, they are also quick rehydrating. For purposes of the present invention, quick rehydrating means reconstitution of the dehydrated product in less than about 15 minutes to a moisture content closely approaching the moisture content of the raw material from which it was made. Replacement of at least 85% and preferably greater than 90 to 95% of the water is required in order for the product to resemble its fresh food counterpart. Moisture replacement can be expressed in terms of the rehydration ratio of the product. Rehydration Ratio, i.e., R.R., is determined by weighing a quantity of dehydrated product, rehydrating such product in water, draining the product of free water, and weighing the rehydrated product. As used herein, rehydration ratio is calculated by dividing the weight of the product after rehydration by the weight of the product in its dehydrated state.

Upon reconstitution, vegetables which have been dehydrated in accordance with the present invention exhibit rehydration ratios which are substantially higher than their conventionally dehydrated counterparts. Rehydration ratios for dehydrated vegetables of the present invention which represent a replacement of at least about 85% of the moisture which had previously been removed during dehydration are listed below:

TABLE II

| Vegetable | Rehydration Ratio (R. R.) |
|---|---|
| Russet Burbank Potatoes | 3.6–5.6 |
| Red Pontiac Potatoes | 5.2–6.5 |
| White Rose Potatoes | 5.3–6.6 |
| Carrots | 5.1–10.5 |
| Sweet Potatoes | 2.7–4.6 |
| Bell Peppers | 6.5–9.5 |
| Barley | 2.9–3.8 |

Another characteristic by which dehydrated products can be evaluated is Bulk Index. Although the determination of Bulk Index is useful to some extent for certain purposes in judging products, Bulk Index data can also give a distorted picture of the product. Bulk Index represents the volume (cc) occupied by 100 grams of product as measured in a 1000 ml. graduated beaker having a 65 mm. internal diameter. It is inversely proportional to bulk density. As such, bulk density and index are somewhat indicative of porosity but not if viewed alone. For example, two dehydrated products may have similar densities but not exhibit the same uniformity of porosity. This could be true if a product of the present invention were compared to a dehydrated puffed-type product. It has been found, therefore, that not all products having similar bulk indices rehydrate in an equivalent manner in terms of time or characteristics of the reconstituted product. Thus, it has been discovered that in order for dehydrated products to be quick-rehydrating in less than about 15 minutes, they should not only exhibit a Bulk Index within the ranges listed in the Table III, but must also manifest a Rehydration Ratio within the ranges listed in Table II. Bulk indices, for representative vegetables having rehydration ratios within the ranges listed in Table II, are shown below:

TABLE III

| Vegetable | Bulk Index (B. I.) |
|---|---|
| Russet Burbank Potatoes | 390–600 |
| Red Pontiac Potatoes | 500–630 |
| White Rose Potatoes | 500–630 |
| Carrots | 400–700 |
| Sweet Potatoes | 350–550 |
| Bell Peppers | 260–300 |
| Barley | 285–335 |

The potato pieces, dehydrated in accordance with the present invention as described above to a final moisture content of about 7% by total weight having a Bulk Index of 495, were held in water that had been brought to a boil for 10 minutes. The reconstituted potato pieces having dimensions of about $\frac{1}{2}'' \times \frac{3}{4}'' \times \frac{3}{4}''$ were determined to have a Rehydration Ratio of 4.75. This product was considered excellent in taste, texture and appearance and exhibited no sign of sloughing.

EXAMPLES

Carrots

In addition to potatoes, carrots are another prime example of vegetable material which can be processed in accordance with the present invention into large, dehydrated pieces which exhibit excellent organoleptic qualities upon subsequent reconstitution. Raw Chantenay variety carrots were lye peeled, cleaned and trimmed. Afterwards the peeled carrots were subdivided cutter. The carrot pieces were cooked for 60 minutes in water having a temperature of about 160° F. and then frozen. The frozen carrot pieces at essentially their natural moisture content of about 90% by total weight were taken from the freezer and subjected to a stream of forced air having a velocity of about 1000 F.P.M. and a temperature of about 325° F. dry bulb/140° F. wet bulb for 11 minutes and partially dried to remove about 74% by weight moisture from the carrots to reduce the moisture content by total weight thereof to about 71%. The partial dried carrots were then finish dried in air having a temperature of about 160° F. to a moisture content of about 5% by total weight in about 4 hours. To rehydrate, the dehydrated carrot pieces having a Bulk Index of 750 were added to boiling water and held for 10 minutes. The reconstituted carrot pieces processed as described above were determined to have a Rehydration Ratio of 9.8. They were judged to be excellent in taste, texture and appearance.

Sweet Potatoes

Sweet potatoes are yet another example of foodstuff which is particularly suitable for processing in accordance with the present invention. Jewel variety sweet potatoes were cleaned of dirt and debris and then lye peeled by submersion in a 13% caustic solution having a temperature of about 200° F. for about 8 minutes. The peeled sweet potatoes were then cut using an Urschel OV machine into 3/16'' slices and blanched in water having a temperature of about 180° F. for about five minutes prior to freezing to a solid state. Thereafter, the frozen slices at essentially their natural moisture content of about 83% by total weight were partially dried by exposure to a forced air stream having a velocity of about 1000 F.P.M. and a temperature of about 310° F. dry bulb/140° F. wet bulb for 10 minutes to remove about 55% by weight moisture from the slices thereby reducing the moisture content by total weight thereof to about 69%. Following partial drying the sweet potato slices were finish dried to a final storage stable moisture content of about 11% by total weight in about 4 hours using air having a temperature of about 140° F. The finish dried slice had a Bulk Index of 410. Afterwards these dehydrated sweet potato slices were rehydrated for 10 minutes in water that had been brought to a boil. The reconstituted product was determined to have a Rehydration Ratio of 3.3. The sweet potato slices exhibited a taste, texture and appearance which were considered to be very acceptable.

Potatoes

Red Pontiac variety potatoes were cut into ½" dice after being prepared for processing in a conventional manner including cleaning and peeling. The dices were then precooked in water at 170° F. for 30 minutes, cooled for about 10 minutes in 60° F. water and cooked in water having a temperature of about 190° F. for 30 minutes prior to freezing. Following freezing the frozen dice at essentially their natural moisture content of about 85% by total weight were subjected to a forced air stream having a velocity of 1200 F.P.M. and a temperature of about 300° F. dry bulb/140° F. wet bulb for about 8 minutes to partially dry the dice by removing about 58% by weight moisture from the dice thereby reducing the moisture content by total weight thereof to about 71%. Thereafter the partially dried dice were finished dried to a storage stable moisture v content of about 6% by total weight in 3½ hours using air having a temperature of about The Bulk Index of the finished dried dice was 590. After reconstitution for 8 minutes in water that had been brought to a boil, the dice were determined to have a Rehydration Ratio of 6.5. The reconstituted dice exhibited excellent texture and appearance and had a very good flavor.

COMPARISON

In order to compare various products made in accordance with the present invention with what is commercially available in the marketplace, the following test was conducted:

Conventional Dehydrated Products

A dehydrated noodle, vegetable, and flavoring mix sold as Soup Starter for use in the preparation of soups was obtained in the grocery store. The dehydrated vegetable products listed in the Table below were selected from this mix and compared for completeness of reconstitution with the potatoes, carrots, barley, green and red bell peppers made in accordance with the present invention as described below.

Products Made by the Invention

Potatoes

Idaho Russet Burbank potatoes were peeled and cut into ⅜-inch dice. The dice were precooked in water at 170° F. for 30 minutes, cooled in 70° F. water for 10 minutes, cooked in water at 180° F. for 30 minutes and frozen. The frozen dice at essentially their natural moisture content of about 81% by total weight were subjected to air having a temperature of about 300° F. dry bulb/140° F. wet bulb and a velocity of about 1200 F.P.M. for about 8 minutes to remove about 45% by weight moisture from the dice thereby reducing the moisture content by total weight thereof to about 70%. The partially dried dice were then finish dried in air at a temperature of about 160° F. dry bulb to a storage stable moisture content of about 6% by total weight in about 3½ hours.

Carrots

Raw carrots were cleaned, peeled and sliced before being cooked in water having a temperature of about 160° F. for 60 minutes and frozen. The frozen slices at essentially their natural moisture content of about 90% were removed from the freezer and subjected to air having a velocity of 1000 F.P.M and a temperature of about 325° F. dry bulb/140° F. wet bulb for 11 minutes to remove about 74% by weight moisture from the slices thereby reducing the moisture content by total weight thereof to about 70%. The partially dried slices were then dehydrated to a storage stable moisture content of about 5% by total weight in about 4 hours in air having a temperature of about 160° F.

Barley

Dry, unprocessed barley was placed in boiling water for 60 minutes prior to being subjected to steam under a pressure of 20 psig. for 10 minutes and then frozen. Prior to freezing the barley had a moisture content of about 85% by total weight. The frozen barley was subjected to an air stream having a velocity of 1000 F.P.M and a temperature of about 300° F. dry bulb/140° F. wet bulb for 16 minutes to remove about 99% by weight moisture from the barley thereby reducing the moisture content by total weight thereof to a storage stable extent of about 4%.

Peppers

Bell peppers of the green and red varieties having a natural moisture content of about 81% by total weight were prepared in essentially the same manner. The peppers were first peeled prior to removing their cores and seeds and cut into ¼-inch square pieces the thickness of which corresponds to the thickness of the flesh of the pepper. The pieces of pepper were then frozen and subjected to air having a velocity of about 750 F.P.M and a temperature of about 300° F. dry bulb/140° F. wet bulb for about 4½ minutes to partially dry the pieces to remove about 12% by weight moisture from the pepper pieces thereby reducing the moisture content by total weight thereof to about 80%. Afterwards the pepper was dried to a storage stable moisture content of about 13% by total weight in two hours using 130° F. air.

The dehydrated vegetable products made in accordance with the invention as described above as well as the conventional dehydrated vegetables from the soup mix were reconstituted for purposes of this comparison in an identical manner. The same weight of each dehydrated product was added to a separate container of boiling water and simmered for the time listed in the Table below. The shorter of the two times are considered acceptable for a quick reconstituting product. In the alternative, ninety minutes was used because such time was specified in the recipe of the commercial soup mix. After simmering for the prescribed times, the vegetables were removed from the water drained and weighed again. As discussed above, the ratio of the weight of the reconstituted product and the weight of the dehydrated product is referred to herein as Rehydration Ratio, i.e., R.R.

The results are tabulated below:

TABLE IV

| Product Size | R. R. of Invention | Min. | R. R. of Conventional |
|---|---|---|---|
| Potatoes ⅜" × ⅜" × ⅜" | 4.7 | 10 | 2.7 |
|  | 5.4 | 90 | 4.7 |
| Carrots Slice | 5.1 | 15 | 3.1 |
|  | 10.9 | 90 | 4.6 |
| Barley Whole | 3.8 | 15 | 2.2 |
|  | 5.2 | 90 | 4.8 |
| Green Bell ¼" × ¼" Peppers | 6.5 | 5 | 5.3 |
|  | 8.3 | 90 | 7.1 |
| Red Bell ¼" × ¼" Peppers | 6.6 | 5 | 4.8 |
|  | 8.3 | 90 | 5.2 |

The tabulated data indicates that each sample of vegetable processed in accordance with the present invention exhibits a Rehydration Ratio consistently higher than their conventionally dehydrated counterpart. The differences are particularly significant for the shorter reconstitution times which are indicative of what is typically the case for a quick-reconstituting product. It is generally recognized that rehydrated products which have higher Rehydration Ratios more closely resemble the fresh material from which it is made. This was found to be true for the comparison made herein particularly for the samples reconstituted for the shorter times. Whereas the products made in accordance with the present invention were considered to be excellent in taste, texture and appearance, the conventionally dehydrated products from the soup mix were found to have hard, chewy interior textures and incompletely developed taste upon reconstitution.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A method for producing a quick-reconstituting foodstuff comprising:
removing moisture from frozen foodstuff, from which substantially no moisture has been artificially removed, by subjecting said foodstuff to a forced stream of gaseous medium having a velocity within the range of 350 to 2,000 F.P.M. effective to fluidize said foodstuff and having a dry bulb temperature in the range of about 250° F. to 350° F. and a wet bulb temperature in the range of about 120° F. to 160° F. and then further dehydrating said foodstuff in an atmosphere having a dry bulb temperature of less than about 220° F. to produce a finish-dried foodstuff having a storage stable moisture content of less than about 12% by total weight and exhibiting a Rehydration Ratio representing the replacement of at least 90% of previously removed moisture after reconstitution for less than about 15 minutes in simmering water.

2. The method for producing a quick-reconstituting foodstuff in accordance with claim 1 wherein said foodstuff comprises vegetable material.

3. The method for producing a quick-reconstituting foodstuff in accordance with claim 2 wherein said vegetable material comprises potatoes, sweet potatoes, carrots, parsnips, beets, beans, peas, peppers, onions, corn, barley, rice and wheat.

4. The method for producing a quick-reconstituting foodstuff in accordance with claim 3 wherein said vegetable material is potatoes.

5. The method for producing a quick-reconstituting foodstuff in accordance with claim 3 wherein said dry bulb temperature is about 300° F. and said wet bulb temperature is 140° F.

6. The method for producing a quick-reconstituting foodstuff in accordance with claim 1 wherein said subjecting said foodstuff to said gaseous medium removes an amount of moisture between about 10 to 99% by weight moisture from said foodstuff.

7. The method for producing a quick-reconstituting foodstuff in accordance with claim 6 wherein said amount is between about 37 to 93% by weight moisture.

8. The method for producing a quick-reconstituting foodstuff in accordance with claim 7 wherein said amount is between about 42 to 77%.

9. The method for producing a quick-reconstituting foodstuff in accordance with claim 1 wherein said atmosphere has a dry bulb temperature between about 120° F. to 185° F.

10. The method for producing a quick-reconstituting foodstuff in accordance with claim 1 further comprising subjecting foodstuff to an aqueous medium having a temperature above about 120° F. prior to removing moisture from said frozen foodstuff.

11. The method for producing a quick-reconstituting foodstuff in accordance with claim 10 wherein said foodstuff is selected from the group consisting of potatoes, sweet potatoes, carrots, parsnips, beets and onions.

12. The method for producing a quick-reconstituting foodstuff in accordance with claim 11 further comprising subdividing said foodstuff into pieces prior to said subjecting.

13. The method for producing a quick-reconstituting foodstuff in accordance with claim 12 wherein said pieces have a minimum dimension of between about 1/16-inch to ¾-inch.

14. The method for producing a quick-reconstituting foodstuff in accordance with claim 13 wherein said pieces range in size from a slice having a thickness of 1/16" to a ¾" dice.

15. The method for producing a quick-reconstituting foodstuff in accordance with claim 14 wherein said pieces are slices having a thickness in the range of about 1/16 inch to ½-inch.

16. The method for producing a quick-reconstituting foodstuff in accordance with claim 14 wherein said vegetable is potato and said pieces are ½"×¾"×¾" strips.

17. The method for producing a quick-reconstituting foodstuff in accordance with claim 14 wherein said vegetable is carrot and said pieces are ½"×½"×¾" strips.

18. The method for producing a quick-reconstituting foodstuff in accordance with claim 14 wherein said dehydrating is accomplished in less than 6 hours.

19. The method for producing a quick-reconstituting foodstuff in accordance with claim 18 wherein said dehydrating is accomplished in 3–5 hours.

20. The method for producing a quick-reconstituting foodstuff in accordance with claim 14 wherein said aqueous medium is steam.

21. The method for producing a quick-reconstituting foodstuff in accordance with claim 10 wherein said temperature is in the range of about 120° to 212° F.

22. The method for producing a quick-reconstituting foodstuff in accordance with claim 21 wherein said foodstuff is cooked at said temperature for up to 75 minutes.

23. The method for producing a quick-reconstituting foodstuff in accordance with claim 22 further comprising precooking said foodstuff at said temperature for between about 3 to 75 minutes followed by cooling in water before said foodstuff is cooked.

24. The method for producing a quick-reconstituting foodstuff in accordance with claim 1 wherein said frozen foodstuff is provided by exposing foodstuff to an atmosphere having a temperature between about −20° to +20° F.

25. The method for producing a quick-reconstituting foodstuff in accordance with claim 1 wherein said dehydrating is accomplished in less than about 6 hours.

26. The method for producing quick-reconstituting foodstuff in accordance with claim 1, comprising:
reconstituting said finish-dried foodstuff to replace at least 90% of the previously removed moisture by simmering said finish-dried foodstuff in water for less than 15 minutes.

27. The method for producing quick-reconstituting foodstuff in accordance with claim 26, wherein said simmering is for about 10 minutes.

28. A method for producing a quick-reconstituting foodstuff comprising:
 (a) providing a quantity of frozen grain; and
 (b) subjecting said grain to a forced stream of gaseous medium having a velocity within the range of about 350 to 2,000 F.P.M. effective to fluidize said grain and having a dry bulb temperature within the range of about 250° F. to 350° F. and a wet bulb temperature within the range of about 120° F. to 160° F. to dehydrate said grain to produce a finish-dried grain having a storage stable moisture content of less than about 12% by total weight and exhibiting a Rehydration Ratio representing the replacement of at least 90% of previously removed moisture after reconstitution for less than about 15 minutes in simmering water.

29. The method for producing quick-reconstituting foodstuff in accordance with claim 28, comprising:
reconstituting said finish-dried grain to replace at least 90% of the previously removed moisture by simmering said finish-dried grain in water for less than about 15 minutes.

30. The method for producing quick-reconstituting foodstuff in accordance with claim 29, wherein said simmering is for about 10 minutes.

* * * * *

UNITED STATES PATENT AND TRADEMARK OFFICE
CERTIFICATE OF CORRECTION

PATENT NO. : 4,889,734

DATED : Dec. 26, 1989

INVENTOR(S) : M. SHATILA

It is certified that error appears in the above-identified patent and that said Letters Patent is hereby corrected as shown below:

column 1, line 39, change "2,705,679," to ---2,705,697---;

column 1, between lines 48 and 49, insert ---temperature at which potato pieces are blanched prior---;

column 3, line 64, change "stem" to ---steam---;

column 4, line 57, change "An" to ---And---;

column 10, line 38, before "cutter" insert ---into " x " x 3/4" pieces using a Urschel Model B---;

column 11, line 37, delete "v" after "moisture";

column 11, line 39, insert ---160°F.--- after "about"; and

Signed and Sealed this

Seventeenth Day of December, 1991

Attest:

HARRY F. MANBECK, JR.

*Attesting Officer*       *Commissioner of Patents and Trademarks*